US009926656B2

(12) United States Patent
Kongo et al.

(10) Patent No.: US 9,926,656 B2
(45) Date of Patent: Mar. 27, 2018

(54) SEWING MACHINE, METHOD FOR DETERMINING EMBROIDERY FRAME AND PROGRAM

(71) Applicant: JANOME SEWING MACHINE CO., LTD., Hachioji-shi, Tokyo (JP)

(72) Inventors: Takeshi Kongo, Hachioji (JP); Takehiro Kodama, Hachioji (JP)

(73) Assignee: JANOME SEWING MACHINE CO., LTD., Hachioji-shi, Tokyo (JP)

(*) Notice: Subject to any disclaimer, the term of this patent is extended or adjusted under 35 U.S.C. 154(b) by 0 days.

(21) Appl. No.: 15/461,476

(22) Filed: Mar. 17, 2017

(65) Prior Publication Data
US 2018/0044829 A1  Feb. 15, 2018

(30) Foreign Application Priority Data
Aug. 12, 2016  (JP) .................... 2016-158793

(51) Int. Cl.
*D05C 5/02* (2006.01)
*D05B 19/08* (2006.01)
(Continued)

(52) U.S. Cl.
CPC ............ *D05B 19/08* (2013.01); *D05B 19/10* (2013.01); *D05C 5/04* (2013.01); *G06K 9/3233* (2013.01); *G06K 9/6202* (2013.01)

(58) Field of Classification Search
CPC ........ D05B 19/00; D05B 19/02; D05B 19/04; D05B 19/06; D05B 19/08; D05B 19/10; D05C 5/02; D05C 5/04
(Continued)

(56) References Cited

U.S. PATENT DOCUMENTS 4,763,586 A * 8/1988 Takenoya ............... D05B 21/00
                                                     112/103
7,392,755 B2 * 7/2008 Kato ....................... D05B 19/12
                                                     112/102.5
(Continued)

FOREIGN PATENT DOCUMENTS

JP   H06-319880 A   11/1994
JP   2002-052283 A   2/2002
JP   2007-252616 A  10/2007

OTHER PUBLICATIONS

Taiwanese Office Action dated Oct. 20, 2017.

*Primary Examiner* — Nathan Durham
(74) *Attorney, Agent, or Firm* — Yokoi & Co., U.S.A.; Toshiyuki Yokoi

(57) ABSTRACT

The present invention provides a sewing machine for identifying the embroidery frame correctly by using the existing mechanism and embroidery frame. A photography unit photographs an attached embroidery frame from a height direction, an embroidery frame transfer unit moves the embroidery frame from a specific location within a region surrounded by the embroidery frame until the photography unit photographs an image of the embroidery frame corresponding to one of the plurality of embroidery frame images registered in the database, a calculation unit calculates a size of the embroidery frame based on a moving distance of the embroidery frame moved by the embroidery frame transfer unit, and an embroidery frame identification unit identifies the embroidery frame based on the size of the calculated embroidery frame.

12 Claims, 12 Drawing Sheets

(51) Int. Cl.
  *G06K 9/32* (2006.01)
  *G06K 9/62* (2006.01)
  *D05B 19/10* (2006.01)
  *D05C 5/04* (2006.01)

(58) Field of Classification Search
  USPC .............................. 112/102.5; 700/136–138
  See application file for complete search history.

(56) References Cited

U.S. PATENT DOCUMENTS

| | | | | |
|---|---|---|---|---|
| 8,522,701 B2* | 9/2013 | Tokura | ................... | D05B 19/16 112/102.5 |
| 8,539,893 B2* | 9/2013 | Tokura | ................... | D05B 19/12 112/102.5 |
| 8,584,607 B2* | 11/2013 | Tokura | ................... | D05B 19/12 112/102.5 |
| 8,612,046 B2* | 12/2013 | Tokura | ................... | D05C 5/06 112/475.19 |
| 8,738,173 B2* | 5/2014 | Tokura | ................... | D05C 5/04 700/138 |
| 8,763,541 B2* | 7/2014 | Tokura | ................... | D05B 19/12 112/102.5 |
| 8,869,721 B2* | 10/2014 | Suzuki | ................... | D05B 19/12 112/102.5 |
| 9,127,385 B2* | 9/2015 | Suzuki | ................... | D05B 19/12 |
| 9,476,150 B2* | 10/2016 | Kawaguchi | ............ | D05B 19/16 |
| 2004/0221780 A1* | 11/2004 | Kawaguchi | ............ | D05B 21/00 112/102.5 |
| 2012/0042816 A1* | 2/2012 | Hirata | ................... | D05B 19/12 112/102.5 |
| 2013/0074748 A1 | 3/2013 | Kato et al. | | |
| 2014/0230708 A1* | 8/2014 | Suzuki | ................... | D05B 19/12 112/102.5 |
| 2015/0259841 A1* | 9/2015 | Ihira | ....................... | D05C 5/04 112/102.5 |

\* cited by examiner identification range R of
inner frame of embroidery frame

| frame name | embroidery range [mm] | | length of inner frame | | number of steps | | image data name | |
|---|---|---|---|---|---|---|---|---|
| | X | Y | X | Y | X | Y | right side | left side |
| GR frame | 230 | 300 | 250 | 320 | 2500 | 3200 | R_image_GR | B_image_GR |
| SG frame | 140 | 140 | 160 | 180 | 1600 | 1600 | R_image_SQ | B_image_SQ |
| FA frame | 40 | 100 | 60 | 120 | 600 | 1200 | R_image_FA | B_image_FA |

SEWING MACHINE, METHOD FOR DETERMINING EMBROIDERY FRAME AND PROGRAM

CROSS-REFERENCES TO RELATED APPLICATIONS

This patent specification is based on Japanese patent application, No. 2016-158793 filed on Aug. 12, 2016 in the Japan Patent Office, the entire contents of which are incorporated by reference herein.

BACKGROUND OF THE INVENTION

1. Field of the Invention

The present invention relates to a sewing machine, a method for identifying an embroidery frame and a program.

2. Description of the Related Art

In some sewing machines capable of being operated in a normal sewing mode and an embroidery sewing mode, an embroidery frame driving device is attached to the sewing machine for sewing an embroidery in the embroidery sewing mode. In this kind of sewing machine, an embroidery frame holding a workpiece cloth to be sewn is attached to a carriage of the embroidery frame driving device, and the embroidery pattern can be sewn on the workpiece cloth based on an embroidery data corresponding to a preliminarily selected embroidery pattern while moving the embroidery frame in an X direction and a Y direction. As described above, a plurality kinds of embroidery frames used for sewing the embroidery is preliminarily prepared according to the size and shape of the embroidery pattern to be sewn.

When an operator attaches an embroidery frame most suitable for the size of the desired pattern to be sewn to the carriage, the sewing machine, which is capable of sewing embroidery, detects the kind of the embroidery frame attached to the carriage to check whether or not the embroidery frame having an embroidery area smaller than the size of the embroidery pattern is incorrectly attached by the operator.

For example, as a method of detecting the kind of the embroidery frame, it is disclosed that an embroidery frame transfer device having an embroidery frame, a carriage capable of attaching and detaching the embroidery frame, and a transfer mechanism for transferring the carriage to two orthogonal directions independently, wherein a movable member is provided on the carriage so as to be switched between a detection position and a retreat position, a detection switch is provided on the movable member so as to detect a detection part of the embroidery frame, and the detection part is detected by the detection switch only when the movable member is switched to the detection position (e.g. shown in Patent document 1).

In addition, it is disclosed that a carriage capable of attaching and detaching an embroidery frame holding a workpiece cloth and an embroidery frame driving mechanism for driving the carriage to orthogonal X and Y directions independently are provided, and an imaging means for photographing an embroidery frame and outputting the image data and a calculation means for calculating a size of the embroidery frame in at least the X and Y directions based on the image data of the embroidery frame are further provided (e.g. shown in Patent document 2).

Furthermore, it is disclosed that a position of the front portion of an embroidery frame is detected when the embroidery frame attached to an embroidery machine is driven to the X-axis positive direction, a tiltable lever is in contact with the front part of the embroidery frame, the tiltable lever is tilted, and a central electrode is in contact with a front electrode. Similarly, a position of the embroidery frame is detected when the rear portion of the embroidery frame is driven to the X-axis negative direction and the tiltable lever is in contact with the rear portion of the embroidery frame. The detected positions of front portion and the rear portion of the embroidery frame are stored in an RAM, and the size of the embroidery frame is further calculated based on these positions to identify the kind of the embroidery frame (e.g. shown in Patent document 3).

[Patent document 1] Japanese Unexamined Patent Application Publication No. 2002-52283
[Patent document 2] Japanese Unexamined Patent Application Publication No. 2007-252616
[Patent document 3] Japanese Unexamined Patent Application Publication No. H06-319880

BRIEF SUMMARY OF THE INVENTION

Patent document 1 discloses the technology that a special detection switch is provided on the carriage and the embroidery frame to detect the kind of the embroidery frame when they are connected, and the technology that a mark is printed on the embroidery frame to judge the mark from the image data of the camera. However, in both cases, certain processing should be applied to the embroidery frame. Thus, there is a problem that the existing embroidery frame cannot be used.

Patent document 2 discloses the method that an unprocessed embroidery frame is photographed by the camera from an oblique direction, an image of the entire embroidery frame is taken in, the image is converted into a plane image data, and then the size of the X and Y directions is calculated. Thus, the embroidery frame is identified. However, in the technology of Patent document 2, when the embroidery frame to be detected is large, the entire embroidery frame cannot be photographed by the camera at a time. Thus, there is a problem that the available embroidery frame is limited.

In the technology of Patent document 3, there is a problem that a new tillable lever is required to detect the kind of the embroidery frame.

The present invention provides a sewing machine for identifying the embroidery frame correctly by using the existing mechanism and embroidery frame.

Embodiment 1: One or more of embodiments of the present invention propose a sewing machine, comprising: a photography unit for photographing an attached embroidery frame from a height direction; a database in which a plurality of embroidery frame images are registered; an embroidery frame transfer unit for moving the embroidery frame from a specific location within a region surrounded by the embroidery frame until the photography unit photographs an image of the embroidery frame corresponding to one of the plurality of embroidery frame images registered in the database; an embroidery frame size calculation unit for calculating a size of the embroidery frame based on a moving distance of the embroidery frame moved by the embroidery frame transfer unit; and an embroidery frame identification unit for identifying the embroidery frame based on the size of the embroidery frame calculated by the embroidery frame size calculation unit.

Embodiment 2: One or more of embodiments of the present invention propose the sewing machine, wherein the embroidery frame images registered in the database are a partial image of the embroidery frame.

Embodiment 3: One or more of embodiments of the present invention propose the sewing machine, wherein the embroidery frame transfer unit moves the embroidery frame so that the photography unit photographs the embroidery frame arranged at a quadrant on which the specific location is located when looked down from the photography unit.

Embodiment 4: One or more of embodiments of the present invention propose the sewing machine, wherein the embroidery frame transfer unit is an X motor for moving the embroidery frame in an X direction or a Y motor for moving the embroidery frame in a Y direction.

Embodiment 5: One or more of embodiments of the present invention propose the sewing machine, wherein the embroidery frame transfer unit is the X motor for moving the embroidery frame in the X direction and the Y motor for moving the embroidery frame in the Y direction.

Embodiment 6: One or more of embodiments of the present invention propose the sewing machine, wherein the embroidery frame transfer unit moves the embroidery frame from the specific location until the photography unit photographs the embroidery frame located in the X direction or the Y direction, and then moves the embroidery frame until the photography unit photographs the embroidery frame located in the other of the X direction and the Y direction.

Embodiment 7: One or more of embodiments of the present invention propose the sewing machine, wherein the embroidery frame size calculation unit calculates the size of the embroidery frame based on a first positional relation between the center of the embroidery frame and the specific location and a second positional relation before and after movement of the embroidery frame transfer unit.

Embodiment 8: One or more of embodiments of the present invention propose the sewing machine, wherein the embroidery frame size calculation unit calculates the size of the embroidery frame based on a third positional relation between an identification range and the center of a photographing range of the photography unit by comparing the embroidery frame images registered in the database with the image of the embroidery frame photographed by the photography unit.

Embodiment 9: One or more of embodiments of the present invention propose the sewing machine, wherein the size of the embroidery frame is a longitudinal length or a lateral length of the embroidery frame.

Embodiment 10: One or more of embodiments of the present invention propose the sewing machine, wherein the embroidery frame has a rectangular shape, a circular shape or an elliptical shape.

Embodiment 11: One or more of embodiments of the present invention propose a method for identifying an embroidery frame of a sewing machine, the sewing machine comprising: a photography unit; an embroidery frame transfer unit; an embroidery frame size calculation unit; and an embroidery frame identification unit, the method comprising the steps of: the photography unit photographing an attached embroidery frame from a height direction; the embroidery frame transfer unit moving the embroidery frame from a specific location within a region surrounded by the embroidery frame until the photography unit photographs an image of the embroidery frame corresponding to one of the plurality of embroidery frame images registered in the database; the embroidery frame size calculation unit calculating a size of the embroidery frame based on a moving distance of the embroidery frame moved by the embroidery frame transfer unit; the embroidery frame identification unit identifying the embroidery frame based on the size of the embroidery frame calculated by the embroidery frame size calculation unit.

Embodiment 12: One or more of embodiments of the present invention propose a program for making a sewing machine execute a method for identifying an embroidery frame; the sewing machine comprising: a photography unit; an embroidery frame transfer unit; an embroidery frame size calculation unit; and an embroidery frame identification unit, the method comprising the steps of: the photography unit photographing an attached embroidery frame from a height direction; the embroidery frame transfer unit moving the embroidery frame from a specific location within a region surrounded by the embroidery frame until the photography unit photographs an image of the embroidery frame corresponding to one of the plurality of embroidery frame images registered in the database; the embroidery frame size calculation unit calculating a size of the embroidery frame based on a moving distance of the embroidery frame moved by the embroidery frame transfer unit; and the embroidery frame identification unit identifying the embroidery frame based on the size of the embroidery frame calculated by the embroidery frame size calculation unit.

One or more of embodiments of the present invention have an effect enabling to identify the embroidery frame correctly by using the existing mechanism and embroidery frame.

DETAILED DESCRIPTION OF THE INVENTION

Figure 1:
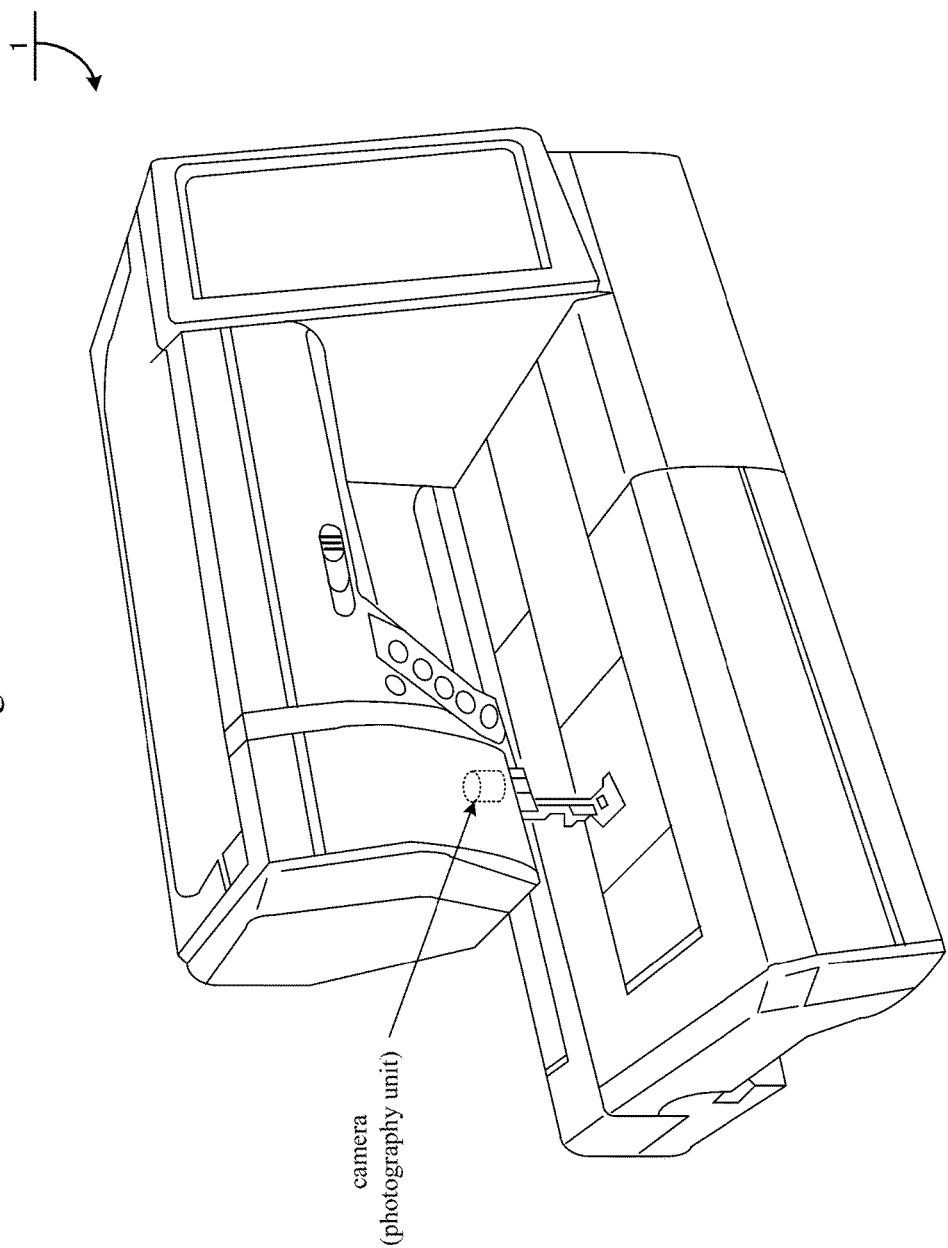
FIG. 1 is a drawing showing an outer appearance of the sewing machine concerning the first embodiment of the present invention.

Hereafter, the embodiments of the present invention will be explained using FIG. 1 to FIG. 12. Note that the scale of the drawing is changed arbitrarily to make the understanding easier.

As shown in FIG. 1, a sewing machine of the present invention has a camera (photography unit) at an arm part to photograph inside the embroidery frame from above (from a height direction). A carriage holding the embroidery frame is positioned toward an initial sensor by a self starting operation of a stepping motor, for example. Then, the carriage is moved by curve-driving of the stepping motor to the center of the embroidery frame with respect to the embroidery frame. Here, the center of the embroidery frame is the common position. In addition, the embroidery frame is moved from the above described position (center) as a starting point to the position where the camera (photography unit) photographs an inner frame of the embroidery frame. Then, a longitudinal length and a lateral length of the inner frame of the embroidery frame is detected based on a moving distance of the embroidery frame, and identifies the kind of the embroidery frame from the detected longitudinal length and lateral length of the inner frame of the embroidery frame. In many cases, the camera photographs "inner flame" of the embroidery frame holding the workpiece cloth. However, the object to be photographed is not limited to "inner flame." The camera can also photograph "outer flame" or the embroidery frame having no distinction between inner/outer frames, for example. Hereafter, detailed contents will be explained.

<Electrical Configuration of Sewing Machine>

An electrical configuration of the sewing machine of the present embodiment will be explained by using FIG. 2.

Figure 2:
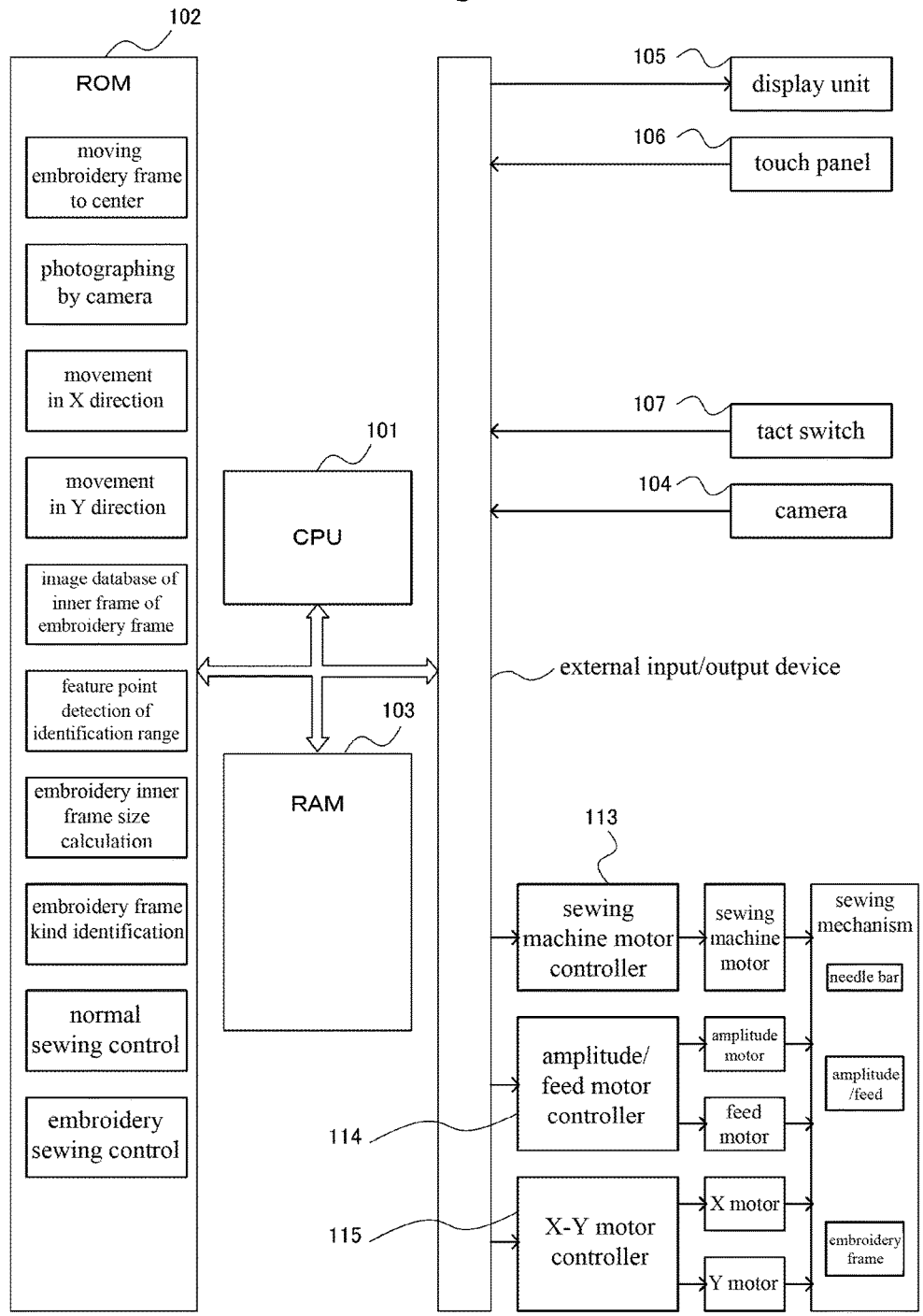
FIG. 2 is a drawing showing an electrical configuration of the sewing machine concerning the first embodiment of the present invention.

As shown in FIG. 2, a sewing machine 1 of the present embodiment is constituted of a CPU 101, a ROM 102, a RAM 103, a camera (photography unit) 104, a display unit 105, a touch panel 106, a tact switch 107, a sewing machine motor controller 113, an amplitude/feed motor controller 114 and an X-Y motor controller 115.

The CPU 101 controls an operation of the entire sewing machine 1 in accordance with control programs. In addition, the CPU 101 is connected with various devices via an external input/output device. In the present embodiment, the CPU 101 functions as the embroidery frame transfer unit to move the embroidery frame from a specific location within a region surrounded by the embroidery frame until the camera (photography unit) 104 photographs an image of the embroidery frame corresponding to one of a plurality of embroidery frame images registered in a later described database by transmitting a control signal to the X-Y motor controller 115, functions as the embroidery frame size calculation unit to calculate a size of the embroidery frame based on a moving distance of the embroidery frame, and functions as the embroidery frame identification unit to identify the embroidery frame based on the calculated size of the embroidery frame.

The ROM 102 stores a program module for controlling the movement of the embroidery frame to the center, a program module for photographing by camera, a program module for controlling movement in X direction, a program module for controlling movement in Y direction, an image database of inner frame of embroidery frame, a program module for feature point detection of identification range, a program module for embroidery inner frame size calculation, a program module for embroidery frame kind identification, a program module for normal sewing, and a program module for embroidery sewing, for example.

The RAM 103 stores program modules read from the ROM 102. The display unit 105 is paired with the touch panel 106 and enables the user to select the pattern such as straight sewing, zigzag sewing and representational pattern. In the embroidery sewing mode, a lot of embroidery data built-in the sewing machine and embroidery data registered in an external media can be selected, for example. Furthermore, various editing operations can be done by using a GUI interface. In the present embodiment, in order to detect the kind of the embroidery frame set on an X-Y mechanism, "embroidery frame kind detection" button is displayed on the display unit 105 in the embroidery sewing mode. Thus, the function of detecting the kind of the embroidery frame is achieved when the button is pressed by a user.

On the tact switch 107, various function buttons required for the operation of the sewing machine, such as start/stop of the sewing machine 1, automatic threading and thread cutting, are arranged.

In the sewing machine motor controller 113, based on a command of the program module for "normal sewing control," the CPU 101 rotates a sewing machine motor to form seams by vertical movement of a needle bar. Furthermore, based on another command, an amplitude motor is driven via the amplitude/feed motor controller 114 to move the needle bar in a zigzag manner, and a feed motor is driven to control a feed amount of the cloth in forward and backward directions. A sewing mechanism is controlled by the sewing machine motor and the amplitude/feed motors to form seams of a straight, zigzag or representational pattern.

The command of the program module for "embroidery sewing control" drives an X motor and a Y motor via the X-Y motor controller 115 to move the embroidery frame of the sewing mechanism in the X direction and the Y direction. A needle location point is determined by the command transmitted to the X motor and the Y motor, and seams are formed by vertical movement of the sewing machine motor. Thus, the pattern is formed.

Figure 3:
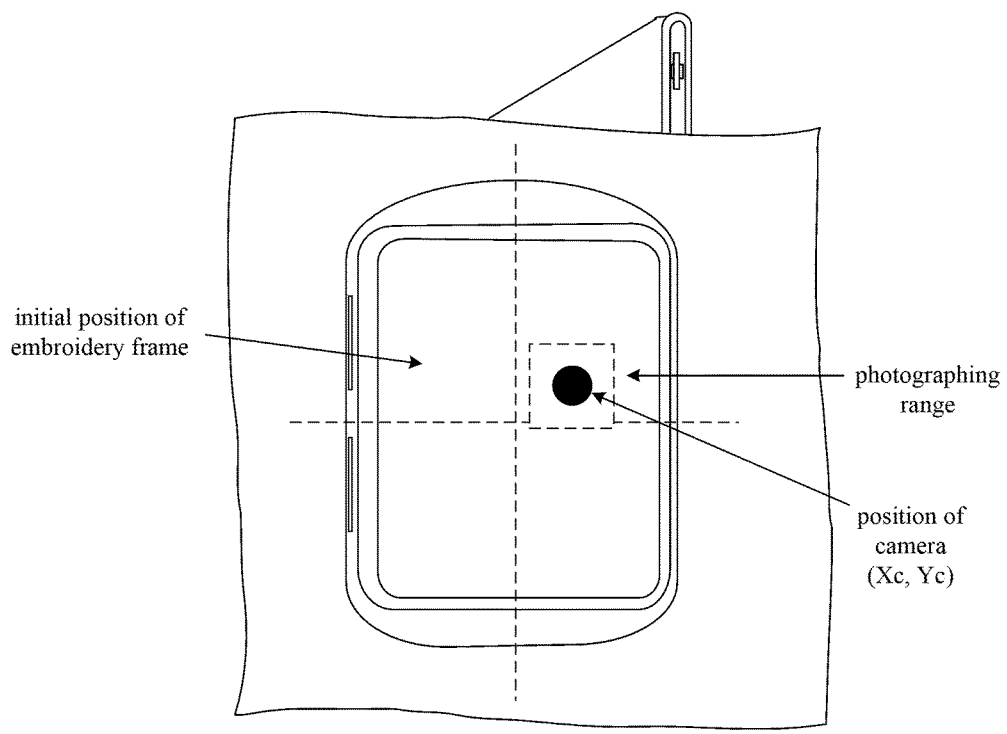
FIG. 3 is a drawing showing a relation between the initial position of the embroidery frame and the initial position of the camera in the sewing machine concerning the first embodiment of the present invention.

The camera (photography unit) 104 is installed in the arm part of the sewing machine to photograph inside the embroidery frame from the above. In the present embodiment, as shown in FIG. 3, when the position of the embroidery frame is initialized, the camera (photography unit) 104 is, as described later, located within the first quadrant in the embroidery frame and arranged close to the center of the embroidery frame by a program module for "moving embroidery frame to center." The camera (photography unit) 104 is functioned by the program module for "photographing by camera." However, the camera 104 does not photograph entire the embroidery frame. The camera 104 photographs a small area and is moved to photograph inside the inner frame of the embroidery frame by the program module for "movement in X direction" and the program module for "movement in Y direction." Note that the camera (photography unit) 104 continues the photographing during the movement of the embroidery frame. After the camera 104 is moved for a while, the inner frame of the embroidery frame enters in the image of the photographing range. Thus, the inner frame of the embroidery frame is recognized by the program.

When detecting the inner frame of the embroidery frame, the image is recognized based on the data of the camera image while the embroidery frame is moved. The moving speed is preferably slow enough so as to be stopped immediately when the inner frame of the embroidery frame is detected. When the carriage is driven by a stepping motor, in order to stop the movement correctly, the carriage should be generally driven at the self-starting speed to prevent a step-out when stopped immediately. However, the self-starting has problems that the moving speed of the self-starting is extremely slow and the operation noise increases. Because of this, curve-driving can be used instead because the moving speed is fast and the operation noise decreases although stopping accuracy is slightly reduced. Note that the number of slow-up and slow-down steps can be specified to be smaller in the curve-driving so that misalignment falls within the margin of error even when the stepping motor overruns.

In "image database of inner frame of embroidery frame," partial images of the inner frame of the embroidery frame corresponding to the moving position in the X direction and the Y direction are registered for each kind of inner frame. By using the program module for "feature point detection of identification range," the inner frame matching with the feature point such as a partial shape and color is searched from the image database. Note that the above described "feature point such as a partial shape and color" is not the feature additionally provided to judge the kind of the embroidery frame, but is the feature originally equipped with each of embroidery frame. When the image of the inner frame of the embroidery frame is recognized within the identification range, one of the program module for "movement in X direction" and the program module for "movement in Y direction" stops driving the motor to stop the movement of the embroidery frame in the direction where the inner frame is detected. After the inner frame of the embroidery frame is detected in both the X direction and the Y direction, the moving distance of the embroidery frame is calculated from the number of steps driven in the X direction and the Y direction by a program module for "embroidery inner frame size calculation." Furthermore, a detection unit calculates a longitudinal length and a lateral length of the inner frame of the embroidery frame while considering the misalignment of the position of the camera (photography unit) 104 and the misalignment of the identification range. Then, from the calculated longitudinal length and lateral length of the inner frame of the embroidery frame, the kind of the embroidery frame is identified based on the preliminarily recorded embroidery frame information by the program module for "embroidery frame kind identification."

FIG. 3 shows a positional relation between the center position of the embroidery frame and the position of the camera (photography unit) 104 attached to the arm part of the sewing machine. As shown in FIG. 3, the camera (photography unit) 104 is attached to the arm part of the sewing machine to photograph the specific location within the region surrounded by the embroidery frame. Here, the specific region is located at one of four quadrants and arranged close to the center of the embroidery frame. Note that FIG. 3 illustrates an example of an arrangement for photographing the first quadrant. The position of the camera (photography unit) 104 is defined by a distance from the center of the embroidery frame, and hereafter the position is shown by coordinate (Xc, Yc).

When a user operates the sewing machine 1 (e.g. pushes the button) for identifying the kind of the embroidery frame attached to the sewing machine 1, the sewing machine 1 moves the embroidery frame to the left direction and the near direction by self-starting using a motor driving controller. At that time, since the motors of the X direction and the Y direction are excited at the same timing, the embroidery frame is moved obliquely at an angle of 45°. However, since the camera (photography unit) 104 photographs the image in the opposite direction, the camera 104 is made close to the right side and the far side of the inner frame of the embroidery frame. Thus, the image of the inner flame enters in the image photographed by the camera 104 from the right side and the far side.

Figure 4:
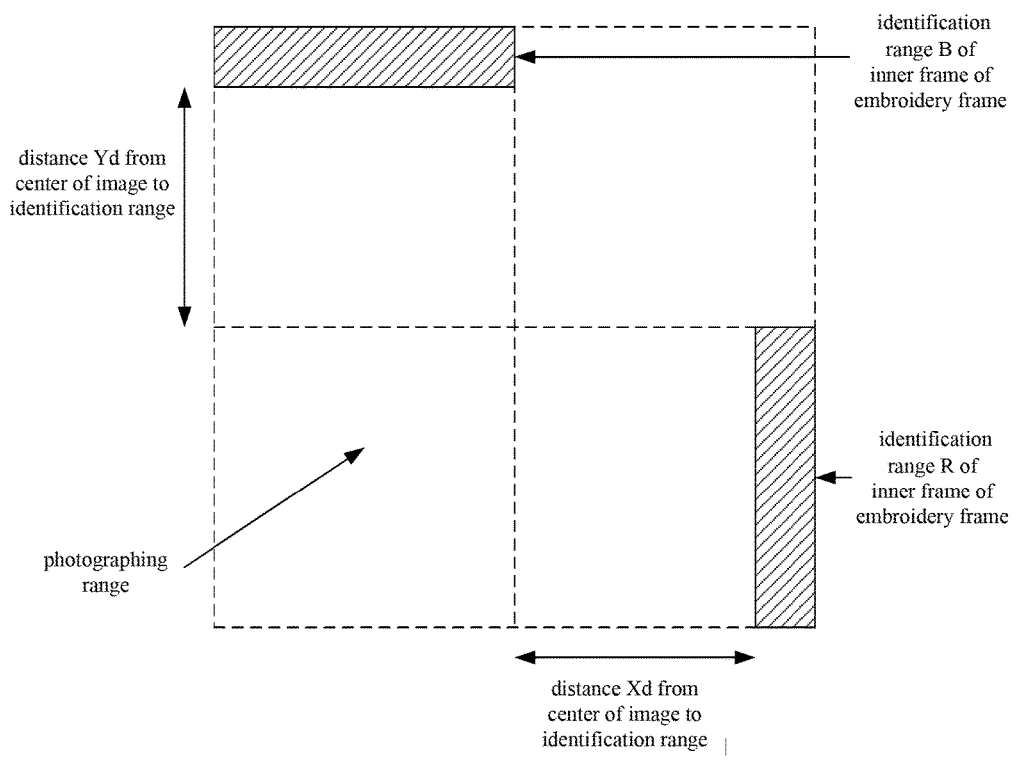
FIG. 4 is a drawing showing a relation between a photographing range and an identification range of an inner frame of the embroidery frame in the sewing machine concerning the first embodiment of the present invention.

FIG. 4 shows the photographing range of the camera (photography unit) 104. In the photographed range, two identification ranges are provided to recognize the partial image of the inner frame of the embroidery frame. An identification range R for identifying the right side of the inner frame of the embroidery frame and an identification range B for identifying the far side of the inner frame of the embroidery frame are shown in FIG. 4. Pattern matching is performed between the partial image of the inner frame of the embroidery frame entered in the image photographed by the camera 104 and the preliminarily stored images. Note that the identification ranges are displaced from the center of the image and the distances of the displacement are hereinafter referred to as Xd and Yd.

Figure 5:
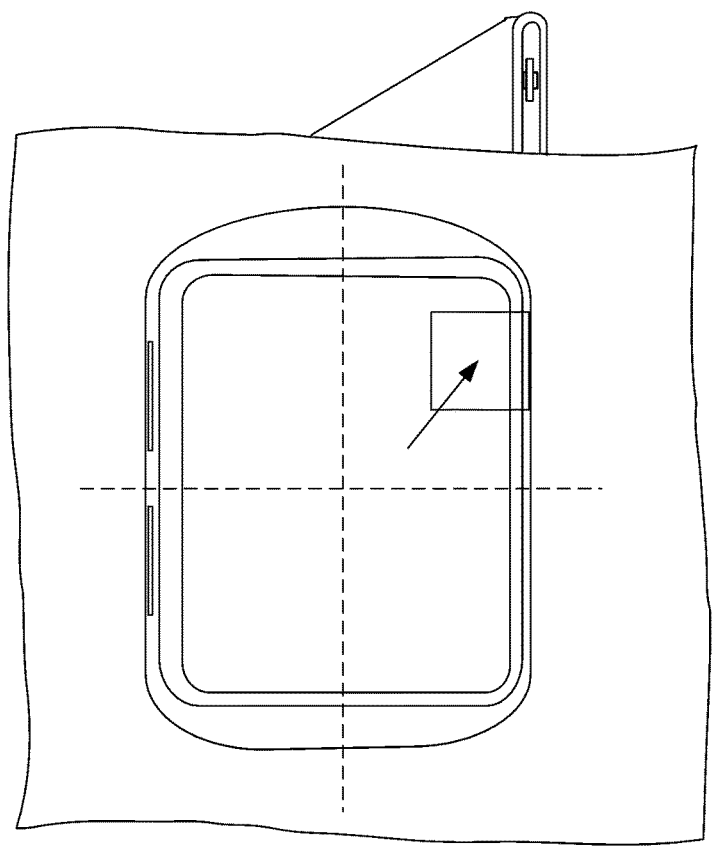
FIG. 5 is a drawing showing the photographing range after being moved in the sewing machine concerning the first embodiment of the present invention.
Figure 6:
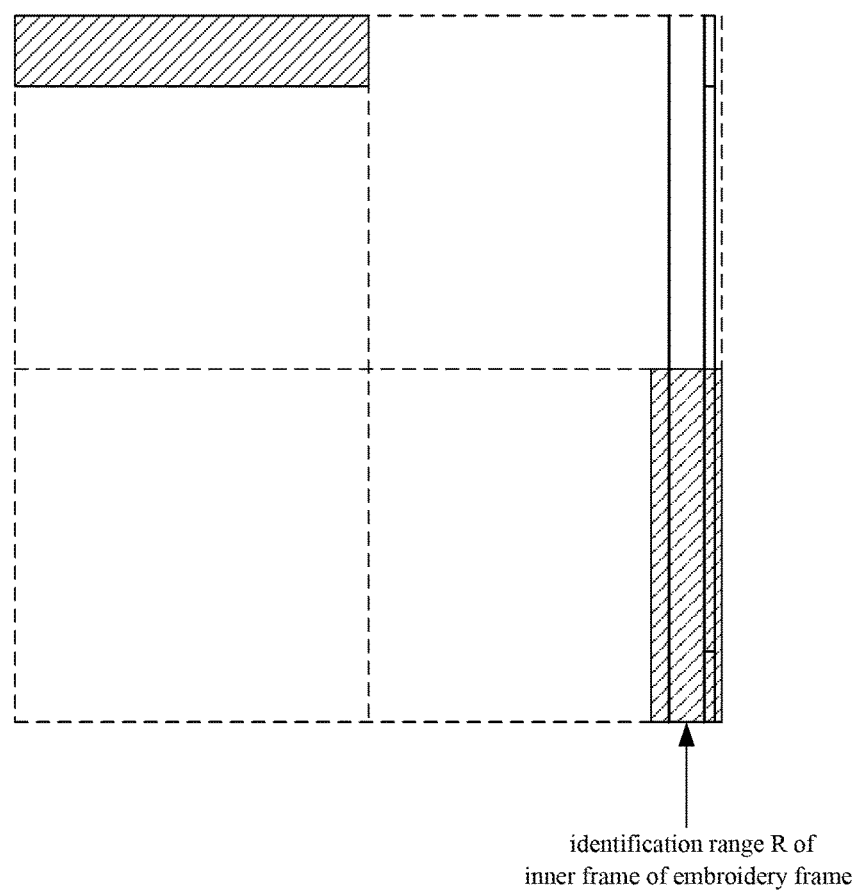
FIG. 6 is a drawing showing the identification range of the inner frame of the embroidery frame after being moved in the sewing machine concerning the first embodiment of the present invention.

In the embroidery frame shown in FIG. 3, the image of the right side of the inner frame of the embroidery frame enters in the photographing range of the camera (photography unit) 104 first as shown in FIG. 5. Then, as shown in FIG. 6, the image photographed within the identification range R is compared with the preliminarily stored images of the inner frame of the embroidery frame. Here, the preliminarily stored images are the images located at the position corresponding to the number or steps moved in the X direction and the Y direction. When the feature point such as a shape and color of an outline of the inner frame of the embroidery frame is matched, the camera (photography unit) 104 is judged to reach the right side of the inner frame of the embroidery frame. Then, a moving distance calculation unit stops driving the motor in the X direction, and calculates a moving distance Xs of the embroidery frame from the number of steps driven in the X direction.

Figure 7:
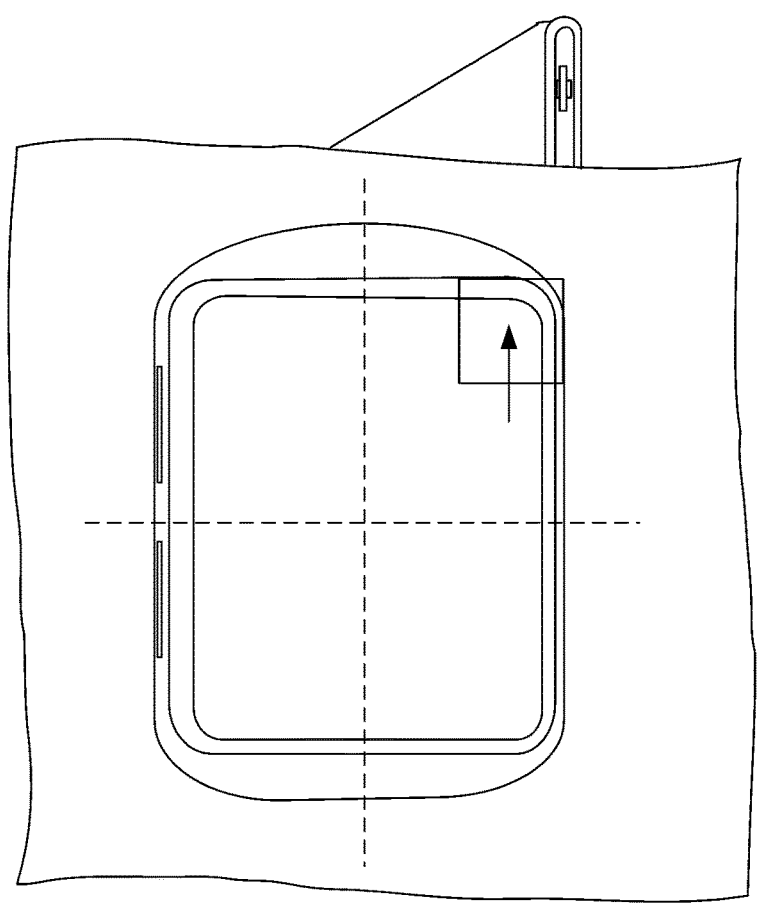
FIG. 7 is a drawing showing the photographing range after being moved again in the sewing machine concerning the first embodiment of the present invention.
Figure 8:
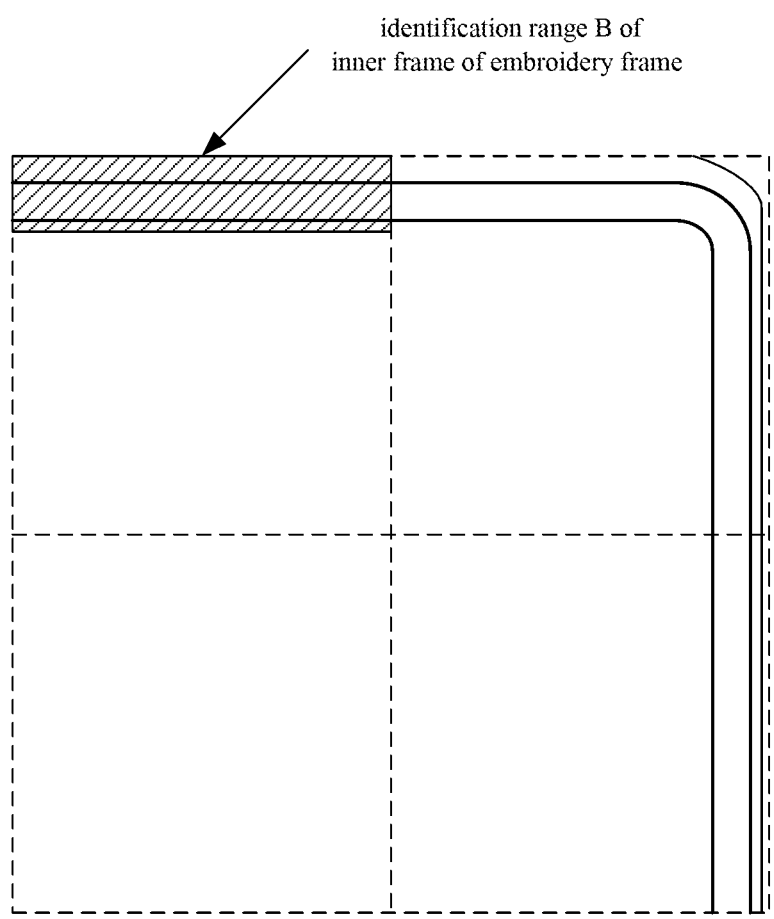
FIG. 8 is a drawing showing the identification range of the inner frame of the embroidery frame after being moved again in the sewing machine concerning the first embodiment of the present invention.

In the embroidery frame shown in FIG. 5, since the inner frame of the embroidery frame located at the far side has not yet entered in the photographing range of the camera (photography unit) 104, the embroidery frame is continued to be driven in the Y direction. After a while, as shown in FIG. 7, the far side of the inner frame of the embroidery frame enters in the photographing range of the camera (photography unit) 104. Then, as shown in FIG. 8, the image photographed within the identification range B is compared with the preliminarily stored images of the inner frame of the embroidery frame. Here, the preliminarily stored images are the images located at the position corresponding to the number or steps moved in the X direction and the Y direction. When the feature point such as a shape and color of an outline of the inner frame of the embroidery frame is matched, the camera (photography unit) 104 is judged to reach the far side of the inner frame of the embroidery frame, and the motor is stopped to be driven in the Y direction. Then, the moving distance calculation unit calculates a moving distance Ys of the embroidery frame from the number of steps driven in the Y direction.

Figure 9:
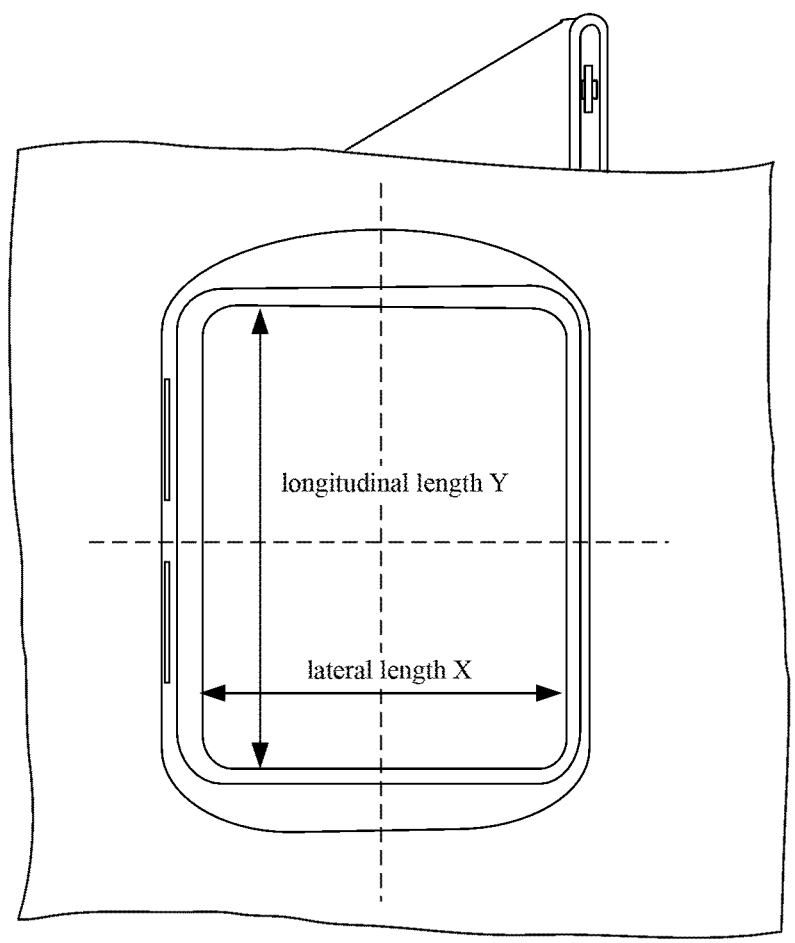
FIG. 9 is a drawing showing a longitudinal length and a lateral length of the embroidery frame in the sewing machine concerning the first embodiment of the present invention.

As shown in FIG. 9, a lateral length X and a longitudinal length Y of the embroidery frame can be calculated from the following formula from a moving distance (Xs, Ys), an installation (initial) position (Xc, Yc) of the camera and identification position (Xd, Yd). Here, the moving distance (Xd, Yd) is calculated from the number of steps that the embroidery frame is driven.

$$X=(Xs+Xc+Xd)\times 2$$

$$Y=(Ys+Yc+Yd)\times 2$$

Figure 10:
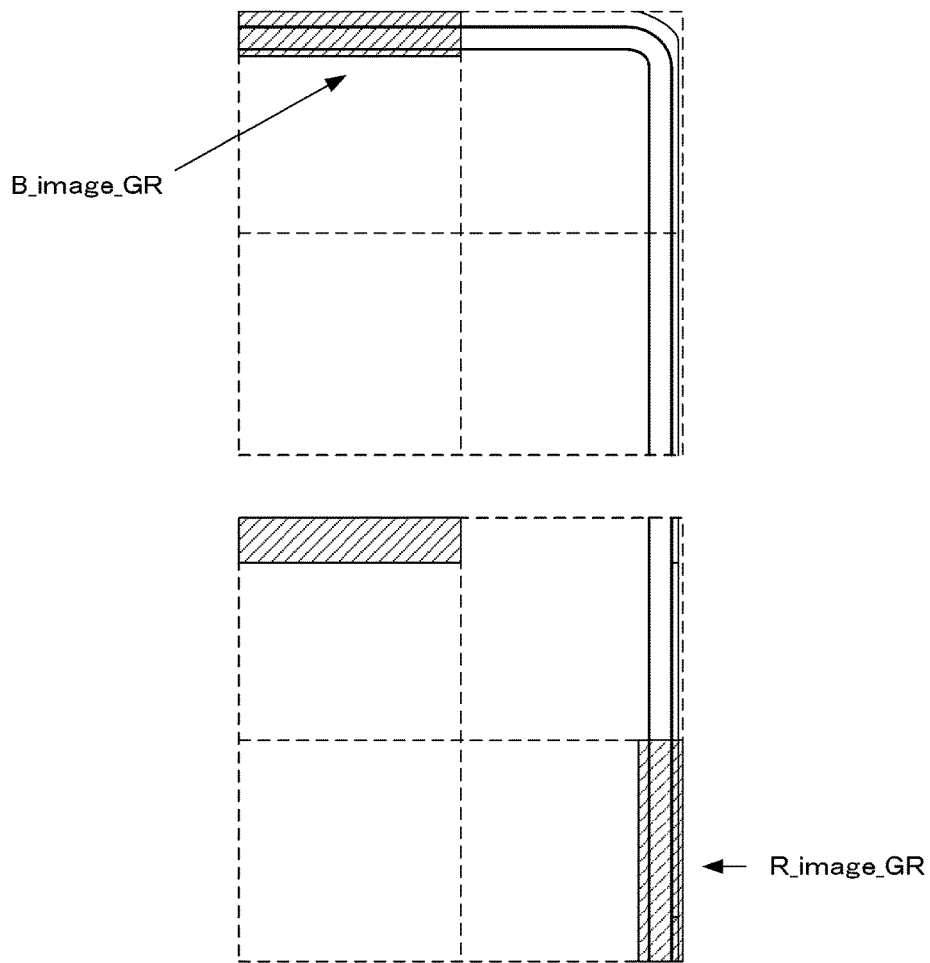
FIG. 10 is a drawing illustrating a database related to the embroidery frame of the sewing machine concerning the first embodiment of the present invention.

Based on the actually measured lengths X, Y of the inner frame of the embroidery frame, as shown in FIG. 10, the closest combination of the lengths X, Y is searched from the preliminarily stored information of the kind of the embroidery frame. Thus, the kind of the embroidery frame is identified. Note that the actual embroidery range is smaller than the measured lengths of the inner frame since a presser, a fastener of the needle bar and the like are existed.

<Process of Detecting Kind of Embroidery Frame>

Figure 11:
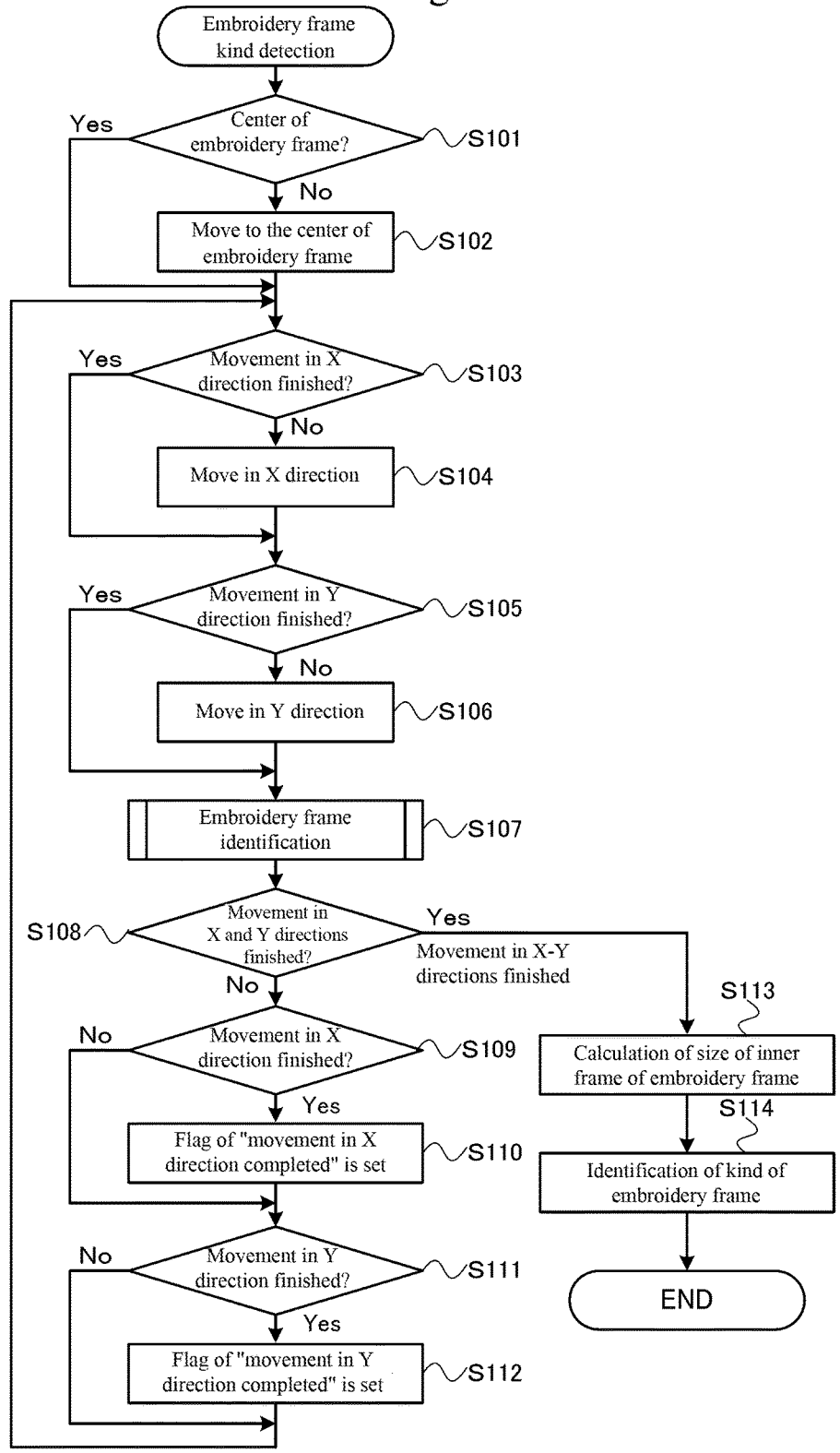
FIG. 11 is a flowchart showing a process of detecting the kind of the embroidery frame in the sewing machine concerning the first embodiment of the present invention.

With reference to FIG. 11, a process of detecting the kind of the embroidery frame in the sewing machine of the present invention will be explained.

When a user presses "embroidery frame kind detection" button on the operation screen of the display unit 105 in the embroidery sewing mode, a program of "embroidery frame kind detection" is executed and the following processes are executed.

First, it is checked whether or not the center of the embroidery frame is located at a needle position (step S101). When the center of the embroidery frame is not located at the needle position ("No" in step S101), "moving embroidery frame to center" is executed and the motor is driven to move the center of the embroidery frame to the needle position (step S102).

When the center of the embroidery frame is moved to the needle position, the motor driving controller drives the X motor and the Y motor by self-starting to bring the embroidery frame close to the photographing range of the camera. It is checked whether or not the movement of the embroidery frame in the X direction is finished by the X motor (step S103). When the movement of the embroidery frame in the X direction is finished ("Yes" in step S103), the step proceeds to step S105.

On the other hand, when the movement of the embroidery frame in the X direction is not finished ("No" in step S103), the movement is performed in the X direction (step S104).

Then, it is checked whether or not the movement of the embroidery frame in the Y direction is finished by the Y motor (step S105). When the movement of the embroidery frame in the Y direction is finished ("Yes" in step S105), the step proceeds to step S107. On the other hand, when the movement of the embroidery frame in the Y direction is not finished ("No" in step S105), the movement is performed in the Y direction (step S106). Then, the process of "embroidery frame identification" is performed (step S107) and a processing result is acquired. Note that the details of the process of "embroidery frame identification" will be explained later.

It is checked whether or not the movement in the X and Y directions is finished from the processing result of "embroidery frame identification" (step S108). When the movement in the X and Y directions is judged to be finished from the processing result ("Yes" in step S108), the moving distance calculation unit calculates the moving distance of the embroidery frame from the number of steps required for the movement. The detection unit calculates the longitudinal length and the lateral length of the inner frame of the embroidery frame from the position of the camera (photography unit) 104 and the identification position (step S113), and extracts the longitudinal and lateral lengths of the inner frame of the embroidery frame closest to the calculation result from the preliminarily stored lengths. The identification unit determines the corresponding embroidery frame as the kind of the embroidery frame (step S114).

On the other hand, when the movement in the X and Y directions is judged not to be finished ("No" in step S108), it is checked whether or not the movement in the X direction is finished (step S109). When the movement in the X direction is judged not to be finished ("No" in step S109), the step proceeds to step S111. On the other hand, when the movement in the X direction is judged to be finished ("Yes" in step S109), a flag of "movement in X direction completed" is set and the step proceeds to step S111.

Then, it is checked whether or not the movement in the Y direction is finished (step S111). When the movement in the Y direction is judged not to be finished ("No" in step S111), the step returns to step S103. On the other hand, when the movement in the Y direction is judged to be finished ("Yes" in step S111), a flag of "movement in Y direction completed" is set and the step returns to step S103. Then, step S103 to step S112 are repeated.

<Process of Embroidery Frame Identification>

Figure 12:
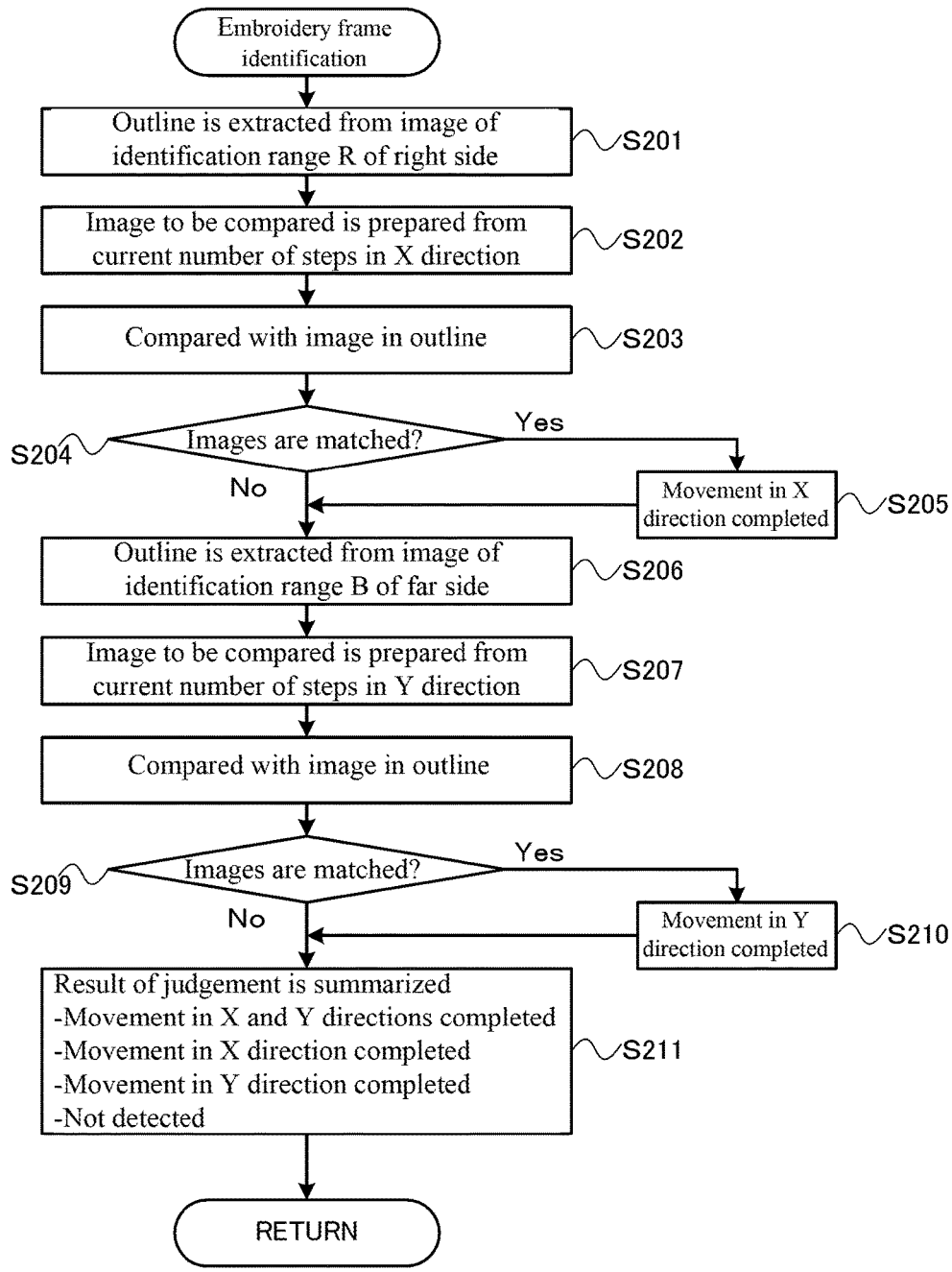
FIG. 12 is a flowchart showing a process of identifying the embroidery frame in the sewing machine concerning the first embodiment of the present invention.

With reference to FIG. 12, process of embroidery frame identification in the sewing machine of the present embodiment will be explained.

As shown in FIG. 10, the sewing machine 1 has a database that stores the number of steps and the image of the embroidery frame when the camera (photography unit) 104 is brought close to the embroidery frame. Here, the process of embroidery frame identification is a process of detecting that the camera reaches above the inner frame of the embroidery frame by comparing the image of the database with the image photographed within the identification range input from the camera (photography unit) 104. Hereafter, the detail of the process will be explained by using the flowchart.

First, the image of the identification range R of the right side is acquired, an outline is extracted, and an outside of the outline is deleted (step S201). By referring to the current number of steps in the X direction, the image to be compared is prepared (step S202). The prepared image and the image photographed within the outline is compared (step S203). When both images are matched ("Yes" in step S204), the movement in the X direction is completed, and therefore the flag of "movement in X direction completed" is set (step S205). When the steps have not reached to the corresponding number, the image to be compared is not existed, and both images are judged to be unmatched ("No" in step S204).

Similarly, the image of the identification range B of the far side is acquired, an outline is extracted, and an outside of the outline is deleted (step S206). By referring to the current number of steps in the Y direction, the image to be compared is prepared (step S207). The prepared image and the image photographed within the outline is compared (step S208). When both images are matched ("Yes" in step S209), the movement in the Y direction is completed, and therefore the flag of "movement in Y direction completed" is set (step S210). When the steps have not reached to the corresponding number, the image to be compared is not existed, and both images are judged to be unmatched ("No" in step S209).

Finally, the result of the judgement is summarized, one of "movement in X and Y directions completed," "movement in X direction completed," "movement in Y direction completed" and "not detected in X and Y directions" is set to a return value of a subroutine (step S211).

In the above described example, the embroidery frame is supposed to be a rectangular shape and the embroidery frame is identified by moving the embroidery frame in both the X direction and the Y direction. However, the present embodiment can be also applied to the embroidery frame having a circular shape and an elliptical shape. For example, when the image of the identification range R of the right side is acquired and the image is curved, the embroidery frame is judged to have a circular shape or an elliptical shape by performing matching with the image stored in the database. Then, the camera (photography unit) 104 is returned to the installation (initial) position (Xc, Yc) of the camera and moved in one of the X direction and the Y direction, and the moving distance of the embroidery frame is calculated from the number of steps when the moving distance calculation unit acquires the image in the identification range R of the right side or the identification range B of the far side. Then, from the position of the camera (photography unit) 104 and the identification position, a radius of the circle is calculated when the embroidery frame has a circular shape, and a long axis or a short axis of the ellipse is calculated when the embroidery frame has an elliptical shape. Then, the inner frame of the embroidery frame having a radius, a long axis or a short axis closest to the calculation result is extracted from the preliminarily stored inner frames. Thus, the corresponding embroidery frame can be identified as the kind of the embroidery frame. When the kind of the embroidery frame is preliminary identified, for example when the embroidery frame to be used is limited to be a regular tetragon, a circle and an ellipse, the embroidery frame can be firstly moved in one of the X direction and the Y direction to identify the kind of the embroidery frame.

As explained above, by using the present embodiment, the camera (photography unit) 104 is attached to the arm part of the sewing machine and the camera 104 just photographs a narrow range directly below the camera 104. Thus, the installation is easy. In addition, the feature point is checked and compared between the partial image of the preliminary stored inner frame of the embroidery frame and the actually photographed image. Thus, detection algorithm is simple. In addition, the inner frame of the embroidery frame is detected and the moving distance of the embroidery frame is measured while the embroidery frame is moved. Thus, the present embodiment can be applied regardless of the size of the embroidery frame. In addition, the motors of the X direction and the Y direction are simultaneously driven to detect the inner frame of the embroidery frame. Thus, useless operation can be omitted. Furthermore, when the kind of the embroidery frame can be identified from one of the X direction and the Y direction of the inner frame of the embroidery frame, the movement is finished only by one direction.

Note that the sewing machine of the present invention can be achieved by recording the process of the sewing machine in a computer system or a computer readable recording medium and making the sewing machine read the programs recorded in the recording medium to execute the programs. Here, the computer system and the computer include an operating system (OS) and a hardware such as a peripheral device.

In addition, the "computer system and the computer" include a home page providing environment (or a home page displaying environment) when using a WWW (World Wide Web) system. In addition, the programs can be transferred from the computer system or the computer storing the programs in a storage device to other computer systems or other computers via a transmission medium or a transmission wave included in the transmission medium. Here the "transmission medium" for transmitting the programs means a medium having a function of transmitting the information. The transmission medium can be a network (communication network) such as an internet and a communication channel (communication line) such as a telephone line.

In addition, the programs can be used only for achieving a part of the above described functions. Furthermore, the programs can be a so-called differential file (differential program) which can achieve the above describe functions by the combination with the programs already recorded in the computer system or the computer.

Although the embodiments of the present invention are explained above with reference to drawings, the specific configuration is not limited to the above described embodiments. The specification can be changed within a range being not deviated from the subject-matter of the present invention.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A sewing machine, comprising:
   a photography unit for photographing an attached embroidery frame from a height direction;
   a database in which a plurality of embroidery frame images are registered;
   an embroidery frame transfer unit for moving the embroidery frame from a specific location until the photography unit detects the embroidery frame corresponding to one of the plurality of embroidery frame images registered in the database;
   an embroidery frame size calculation unit for calculating a size of the embroidery frame based on a moving distance of the embroidery frame from the specific location until the photography unit detects the embroidery frame, the embroidery frame being moved by the embroidery frame transfer unit; and
   an embroidery frame identification unit for identifying the embroidery frame based on the size of the embroidery frame calculated by the embroidery frame size calculation unit.

2. The sewing machine according to claim 1, wherein the embroidery frame images registered in the database are a partial image of the embroidery frame.

3. The sewing machine according to claim 1, wherein the embroidery frame transfer unit moves the embroidery frame so that the photography unit photographs the embroidery frame arranged at a quadrant on which the specific location is located when looked down from the photography unit.

4. The sewing machine according to claim 1, wherein the embroidery frame transfer unit is an X motor for moving the embroidery frame in an X direction or a Y motor for moving the embroidery frame in a Y direction.

5. The sewing machine according to claim 4, wherein the embroidery frame transfer unit is the X motor for moving the embroidery frame in the X direction and the Y motor for moving the embroidery frame in the Y direction.

6. The sewing machine according to claim 5, wherein the embroidery frame transfer unit moves the embroidery frame from the specific location until the photography unit photographs the embroidery frame located in the X direction or the Y direction, and then moves the embroidery frame until the photography unit photographs the embroidery frame located in the other of the X direction and the Y direction.

7. The sewing machine according to claim 1, wherein the embroidery frame size calculation unit calculates the size of the embroidery frame based on a first positional relation between the center of the embroidery frame and the specific location and a second positional relation before and after movement of the embroidery frame transfer unit.

8. The sewing machine according to claim 7, wherein the embroidery frame size calculation unit calculates the size of the embroidery frame based on a third positional relation between an identification range and the center of a photographing range of the photography unit by comparing the embroidery frame images registered in the database with the image of the embroidery frame photographed by the photography unit.

9. The sewing machine according to claim 1, wherein the size of the embroidery frame is a longitudinal length or a lateral length of the embroidery frame.

10. The sewing machine according to claim 1, wherein the embroidery frame has a rectangular shape, a circular shape or an elliptical shape.

11. A method for identifying an embroidery frame of a sewing machine,
the sewing machine comprising:
    a photography unit;
    an embroidery frame transfer unit;
    an embroidery frame size calculation unit; and
    an embroidery frame identification unit,
the method comprising the steps of:
    the photography unit photographing an attached embroidery frame from a height direction;
    the embroidery frame transfer unit moving the embroidery frame from a specific location until the photography unit detects the embroidery frame corresponding to one of the plurality of embroidery frame images registered in the database;
    the embroidery frame size calculation unit calculating a size of the embroidery frame based on a moving distance of the embroidery frame from the specific location until the photography unit detects the embroidery frame, the embroidery frame being moved by the embroidery frame transfer unit; and
    the embroidery frame identification unit identifying the embroidery frame based on the size of the embroidery frame calculated by the embroidery frame size calculation unit.

12. A non-transitory computer readable medium having a program stored thereon, the program making a sewing machine execute a method for identifying an embroidery frame;
the sewing machine comprising:
    a photography unit;
    an embroidery frame transfer unit;
    an embroidery frame size calculation unit; and
    an embroidery frame identification unit,
the method comprising the steps of:
    controlling the photography unit to photograph an attached embroidery frame from a height direction;
    controlling the embroidery frame transfer unit to move the embroidery frame from a specific location until the photography unit detects the embroidery frame corresponding to one of the plurality of embroidery frame images registered in the database;
    calculating a size of the embroidery frame based on a moving distance of the embroidery frame from the specific location until the photography unit detects the embroidery frame, the embroidery frame being moved by the embroidery frame transfer unit; and
    identifying the embroidery frame based on the size of the embroidery frame calculated by the embroidery frame size calculation unit.

* * * * *